Patented Aug. 29, 1933

1,925,058

UNITED STATES PATENT OFFICE 1,925,058

PROCESS FOR FORMING PLASTIC CLAY MASSES

Davidge H. Rowland and Kurt Wetzel, Baltimore, Md., assignors to Locke Insulator Corporation, Baltimore, Md., a corporation of Maryland No Drawing. Application November 11, 1929
Serial No. 406,501

3 Claims. (Cl. 25—156)

It is well known that in the manufacture of ceramic bodies there are two general methods of formation, one by casting and the other by shaping by means of plunging, turning or other similar apparatus and the present invention relates particularly to the second named method. The primary step involves grinding the relatively dry materials, such as clays, felspar, flint and the like and adding sufficient water at the same or a subsequent time to make a fluid mass which is known as clay slip. In order to remove the lignite and other impurities from this slip it is passed through very fine meshed lawns and it is obvious that to effect thorough cleaning the slip must be quite fluid, a circumstance which calls for a large amount of water in proportion to the solid ingredients. After lawning, the slip is run into filter presses so that the excess water may be removed, leaving a plastic body which is then passed through pug mills, mauled or wedged by hand or otherwise and then placed in molds ready for forming or shaping into insulators by means of plunging apparatus or the like, the process of manufacture being continued by drying, glazing and firing the insulators or other ceramic articles to be made.

A great difficulty with the method above outlined is that it is not commercially practicable to form insulators or the like from plastic clay containing more than from 22 to 26% water and it is equally impracticable to lawn the slip and mix the ingredients properly, under ordinary circumstances, unless the water content in the preliminary mix is as high as from 50 to 60%. From a careful study of these facts it can be seen that the factor which requires three very expensive steps in the process of making up clay bodies, i. e., filtering, pugging and mauling, is the excess water introduced at the beginning of the process. Furthermore clay produced by ordinary methods is not uniform, owing to variations in different batches.

For some time it has been known that the addition of certain substances to mixtures of clays and water will greatly increase the fluidity of the mix or in other words attain the same fluidity with a much smaller quantity of water. This result may be brought about by the addition of a proper proportion of sodium carbonate, sodium silicate, ammonium hydroxide, caustic soda, sodium oxalate, and quite a number of other similar substances, any of which has an action, apparently, very similar to that of a chemical reaction inasmuch as the alkali is fixed as if it were combined with part of the clay substance. The physical effect of the action is that the clay particles become much smaller by the disintegration of the larger aggregates into individual particles. Furthermore the chemical action results in the liberation of some part of the water from the clay particles themselves and this water becoming free increases the fluidity. This reaction between the alkali and the acid clay colloid is ordinarily referred to as deflocculation which is of course the opposite of coagulation. This known action is taken advantage of in the making of ceramic ware by the casting process as it is possible to treat a clay slip containing a proportion of water permissible for casting and increase its fluidity so that the preliminary steps of lawning or other cleansing may be readily carried out. However, clay slip which has been deflocculated has little plasticity and does not possess the quality of malleability, a fact that precludes the use of clay treated in this manner for making insulators or other ceramic bodies by the plunging or other shaping methods which require plasticity of the clay mass.

It is with the above facts in view that we have devised the present invention which has for its general object the provision of a method for restoring the plasticity of previously deflocculated clay slip.

An important object of the invention is to provide a method for restoring the plasticity to a previously deflocculated clay slip by means of a delayed chemical reaction, the presence of the previously added deflocculating agent being nullified or neutralized so that the clay will resume its natural state and become repossessed of the quality of plasticity. Briefly considered, the invention comprises the addition to a deflocculated clay slip, subsequent to lawning or other treatment, of a chemical of some suitable sort which will neutralize the deflocculating action. Clearly, the nature of the exact material used and the quantity thereof must necessarily depend on the character and proportion of the previously employed deflocculating agent. However, generally speaking, the deflocculating agent is an alkali and may be any one of those mentioned above, from which it follows that the reflocculating agent would be a substance capable of uniting with and neutralizing the deflocculating agent and overcoming the deflocculating action. It is very probable that the exact salt or other proper substance used will depend upon the particular alkali but the selection may be easily made by the application to the problem of the well known laws of chemistry.

In the actual carrying out of the invention it is intended that a salt or other substance of a suitable character and in the proper proportion be added to a previously deflocculated clay slip and intimately commingled therewith so as to effect a delayed neutralization of the deflocculating action throughout all portions of the fluent mass. The exact manner in which this may be done is rather immaterial in so far as the essence of the invention is concerned but in the co-pending application of Davidge H. Rowland for patent for apparatus for making flocculated clay slip, filed of even date herewith and given Serial No. 406,455 there is disclosed a means whereby this action may be brought about in a simple and continuous manner. As the apparatus has no proper place in the present application it is not discussed herein as reference may be had to the co-pending application.

Assuming that the deflocculated clay slip has been subjected to the action of a salt capable of reacting with whatever deflocculating material was employed, it will be apparent that the action of the deflocculent will be neutralized and the deflocculating agent converted into a substance incapable of influencing the clay colloid whereupon the latter will again take on its natural characteristic of plasticity so that when it is disposed within a mold or other suitable support it may be plunged, subjected to the action of a turning tool or the like and otherwise treated in exactly the same manner as clay extruded from a pug mill, and that, moreover, not necessarily at once but even after the lapse of an appreciable time.

Though it should be distinctly understood that there is no particular limitation as to the exact materials or substances capable of bringing about the desired results, yet at the same time for purposes of illustration it may be well to mention that we have carried out the method by employing a reflocculating agent consisting of one-half part calcium sulphate and one-half part of Portland cement held in a suspension of kerosene. This mixture is preferably made up to the same specific gravity as the clay slip and we have found that approximately $\frac{1}{10}$ of 1% by weight of this mixture is necessary to flocculate or reflocculate the clay properly. It seems that the kerosene surrounds the small particles of calcium sulphate and cement and consequently delays the flocculating action when this material comes into contact with the clay slip. A substantially instantaneous flocculation does not seem to bring about as beneficial results as the delayed action, the reason probably being that during the prolonged period there is opportunity for all of the clay to be acted upon so that a homogeneous mass will eventually result.

The advantages of our method are numerous. One is that clay containing really only a comparatively small percentage of water, not in excess of that permissible for the manufature of ceramic bodies, may be made sufficiently fluid to permit lawning but yet which will, on account of the low water content, not need to be subjected to the action of filter presses or the like. Another advantage is that the necessity for pugging or any manual mauling or wedging is entirely obviated, thereby not only decreasing the labor and time required by such operation but also obtaining a more homogeneous mass. To clarify the meaning of this statement it may be well to explain that the rotating blades of a pug mill exert a cutting action on the clay mass and that even though the clay be subsequently worked, as by hand mauling, wedging or other treatment, there is still a tendency for the development of laminations which may frequently cause cracking and breaking of the ceramic ware after it is fully formed and while it is either being dried or fired in a kiln. By rendering the use of a pug mill unnecessary it is clear that the present method will result in the production of superior clay which will be free from such defects.

From the foregoing description it will be apparent that we have thus provided a very simple process for treating clay which will greatly reduce the cost of manufacture on account of the reduction in the time and labor necessary for the preparation of the clay to render it fit for plunging or molding. By a judicious choice of deflocculating and reflocculating agents and by the exercise of proper care in regard to the question of quantities thereof it may be possible to control, in point of time, the return of the clay to its plastic condition as in some instances it might be advisable to have this either retarded or hastened as the case may be. The features of superiority of the clay treated in this manner have already been discussed and it is thought that the benefits to be derived from the carrying out of the invention will be readily understood by one skilled in the art without further explanation.

While we have described a preferred embodiment of the invention, it should of course be understood that the ingredients mentioned and the precise steps are for illustrative purposes only and that the right is reserved to make all such changes as will not depart from the spirit of the invention or the scope of the claims hereunto appended.

Having thus described the invention, we claim:

1. In the manufacture of ceramic ware, the step of deflocculating a clay slip to increase its fluidity, reflocculating the same to restore its plasticity, and plunging the same to effect shaping.

2. A method of treating clay slip comprising deflocculating the same to increase its fluidity, effecting retarded reflocculation to restore its plasticity, and plunging the same to effect shaping.

3. In the manufacture of a clay mass, the step of forming a clay slip with a water content permissible for molding, deflocculating the same to increase its fluidity without increasing the free water content, reflocculating the slip to restore its plasticity, and plunging the same to effect shaping.

DAVIDGE H. ROWLAND.
KURT WETZEL.